United States Patent [19]
Amiguet et al.

[11] Patent Number: 5,503,508
[45] Date of Patent: Apr. 2, 1996

[54] APPARATUS FOR, AND METHOD OF, DRILLING LUG HOLES AND VALVE STEM HOLES IN MOTOR VEHICLE WHEELS

[75] Inventors: Eugene W. Amiguet, Cypress; Jonathan A. Perez, Rancho Santa Margarita, both of Calif.

[73] Assignee: Ellison Machinery Company, Santa Fe Springs, Calif.

[21] Appl. No.: 243,472

[22] Filed: May 16, 1994

[51] Int. Cl.$^6$ .............................. B23B 35/00; B23B 41/00
[52] U.S. Cl. ........................... 408/1 R; 269/24; 279/137; 408/79; 408/103
[58] Field of Search .......................... 269/24, 309, 310; 408/1 R, 79, 89, 103, 108; 279/127, 133, 137

[56] References Cited

U.S. PATENT DOCUMENTS

| | | | |
|---|---|---|---|
| 1,412,170 | 4/1922 | Dixon | 279/8 |
| 1,498,879 | 6/1924 | Lofland | 408/79 |
| 1,821,926 | 9/1931 | Booth | 408/189 |

FOREIGN PATENT DOCUMENTS

| | | | |
|---|---|---|---|
| 312819 | 4/1989 | European Pat. Off. | 408/103 |
| 29513 | 12/1969 | Japan | 279/137 |
| 848168 | 7/1981 | U.S.S.R. | 279/137 |

*Primary Examiner*—Daniel W. Howell
*Attorney, Agent, or Firm*—Ellsworth R. Roston; Charles H. Schwartz

[57] ABSTRACT

A member is disposed against a motor vehicle wheel at a position near the center of a bore for receiving the wheel axle. The member may be a collet expansible radially against the annular wall defining the central bore. Alternatively, a ring may be moved into concentric relationship with the central bore and then disposed against the back side of the wheel. Clamping members are then moved, preferably axially and rotationally, against the wheel front side at a position near the wheel periphery. A snubber ring is thereafter moved against the wheel back side, preferably at a position corresponding radially to the positions of the clamping members against the wheel. Each member at the wheel periphery may be moved by introducing hydraulic fluid into an individual one of a plurality of cylinders to move a piston coupled to such member. Such fluid may pass initially through first lines to the cylinders associated with the clamping members and then through the lines and a second line to the cylinder associated with the snubber ring. Because of its size, the second line provides fluid to the snubber ring only after the clamping members have been disposed against the wheel. The lug holes and the valve stem hole may be drilled from opposite sides of the wheel after the wheel has been clamped.

48 Claims, 10 Drawing Sheets

5,503,508

1

APPARATUS FOR, AND METHOD OF, DRILLING LUG HOLES AND VALVE STEM HOLES IN MOTOR VEHICLE WHEELS

This invention relates to apparatus for, and methods of, providing for the drilling of lug holes, and holes for the valve stems of wheel tires, in wheels of motor vehicles. More particularly, the invention relates to apparatus for, and methods of, providing for the drilling of lug holes concentric with the center of the motor vehicle wheel and without any irregularities in the holes and for the drilling of holes for the valve stems of wheel tires.

Motor vehicles wheels have a central bore for receiving an axle on the motor vehicle and also have lug holes displaced radially outwardly from the central bore for receiving threaded lugs on the motor vehicle. The axle extends through the central bore and the threaded lugs extend through the lug holes. Nuts are attached to the lugs in sockets which are formed on the wheels around the lug holes to receive the nuts when the nuts are threaded on the lugs. Each wheel also has a hole for receiving the valve stem of the tire which is disposed on the wheel.

It is important that the lug holes are concentric with the center of the wheel and that the sockets for receiving the nuts threaded on the lugs are concentric with the lug holes. If the lug holes and/or the sockets are off-center relative to the center of the wheel, the lugs tend to work against the surfaces defining the lug holes, and the nuts tend to work against the surfaces defining the peripheries of the sockets. This is particularly true since the lugs on the wheels are concentric with the axles for such wheels. Such workings tend to increase the off-centered relationship, particularly since the wheels tend to be made from a relatively soft material such as aluminum. Eventually as a result of such working, the wheels tend to become loose and even fall off the motor vehicle. When this occurs, a serious accident can result with considerable damage to property and serious injury, sometimes even death, to individuals.

Apparatus now exists, and has been in use for many years, for drilling lug holes in wheels for motor vehicles and in drilling holes for receiving valve stems on the tires disposed on the wheels. Such apparatus has certain inherent defects. The apparatus does not drill the lug holes in a concentric relationship with the centers of the wheels. This has created problems as discussed in the previous paragraph. Furthermore, the drilling apparatus tends to vibrate as it drills the lug holes in the wheels and the sockets for receiving the nuts and in drilling the holes for receiving the valve stems on the tires disposed on the wheels. These vibrations have caused the peripheries of the holes and sockets to have irregularities. These irregularities have caused the lugs and the lug nuts to work against the wheel material at the peripheries of the lug holes and the sockets so that the irregularities become magnified and the wheels eventually become loose. The defects in the apparatus now in use have been known for some time. A considerable effort has been devoted, and considerable money has been expended, to overcome the problems discussed above but the problems still persist.

This invention provides apparatus for, and methods of, resolving the problems discussed in the previous paragraph. In accordance with the apparatus and methods of this invention, the drilling apparatus is centered relative to the wheel before the lug holes are drilled in the wheel. Furthermore, the wheel is clamped near the center and the periphery of the wheel before the lug holes are drilled. In this way, the lug holes and the sockets for the nuts are drilled in a co-axial relationship with the center of the wheel and are drilled without any burrs so that any workings by the lugs and the lug nuts to enlarge the holes are avoided. Furthermore, the wheel is positioned before any drilling of holes so that the hole for the valve stem or the tire is disposed on the wheel so that the valve stem hole is properly positioned relatively to the other holes, including the lug holes in the wheel.

In one embodiment of the invention, a member is disposed against a motor vehicle wheel at a position near the center of a bore for receiving the wheel axle. The member may be a collet expansible radially against the annular wall defining the central bore. Alternatively, a ring may be moved into concentric relationship with the central bore and then disposed against the back side of the wheel.

Clamping members are then moved, preferably axially and rotationally, against the front side of the wheel at a position near the wheel periphery. A snubber ring is thereafter moved against the back side of the wheel, preferably at a position corresponding radially to the positions of the clamping members against the wheel.

Each member at the wheel periphery may be moved by introducing hydraulic fluid into an individual one of a plurality of cylinders to move a piston coupled to such member or ring. Such fluid may pass initially through first lines to the cylinders associated with the clamping members and then through these lines and a second line to the cylinder associated with the snubber ring. Because of its size, the second line fluid to the snubber ring only after the clamping members have been disposed against the wheel. The lug holes and the valve stem hole may be drilled in the wheel from opposite sides of the wheel after the wheel has been clamped.

Members position the wheel to dispose the valve stem hole properly relative to the other holes (e.g. the lug holes) on the wheel. Other members compensate for different axial widths and radii of individual wheels.

Figure 1:
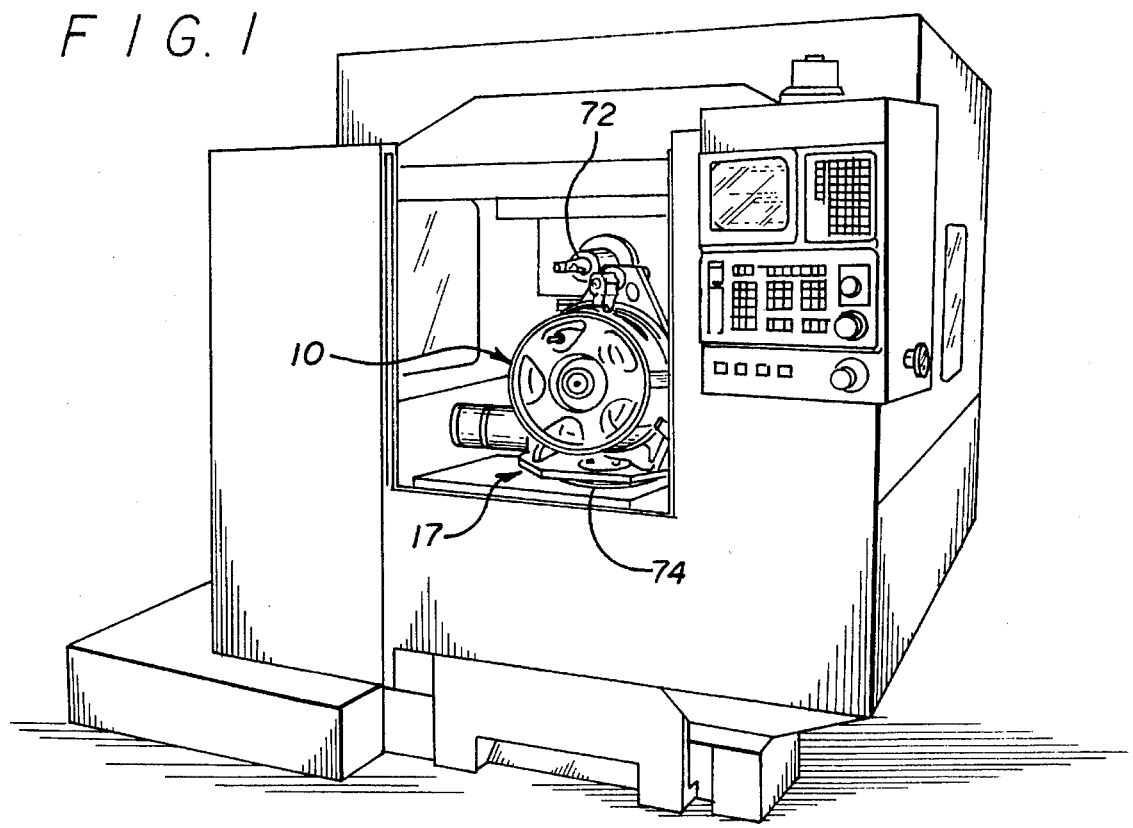
FIG. 1 is a schematic perspective view of apparatus primarily from the front of the apparatus, constituting one embodiment of the invention for drilling lug holes in a wheel and also for drilling a valve stem hole.

In one embodiment of the invention, a motor vehicle wheel generally indicated at 10 is provided with a central bore 12 for receiving the axle (not shown) of a wheel on the motor vehicle. The central bore 12 is defined by a wall 13 in the wheel at the outer radial periphery of the bore. The wheel 10 also has an external periphery 14 for receiving and holding a tire (not shown). Flanges 15 and 16 are disposed at opposite ends of the external periphery 14 for seating and confining the tire when the tire is inflated with air. A rim 19 protrudes from the flange 16.

Figure 4:
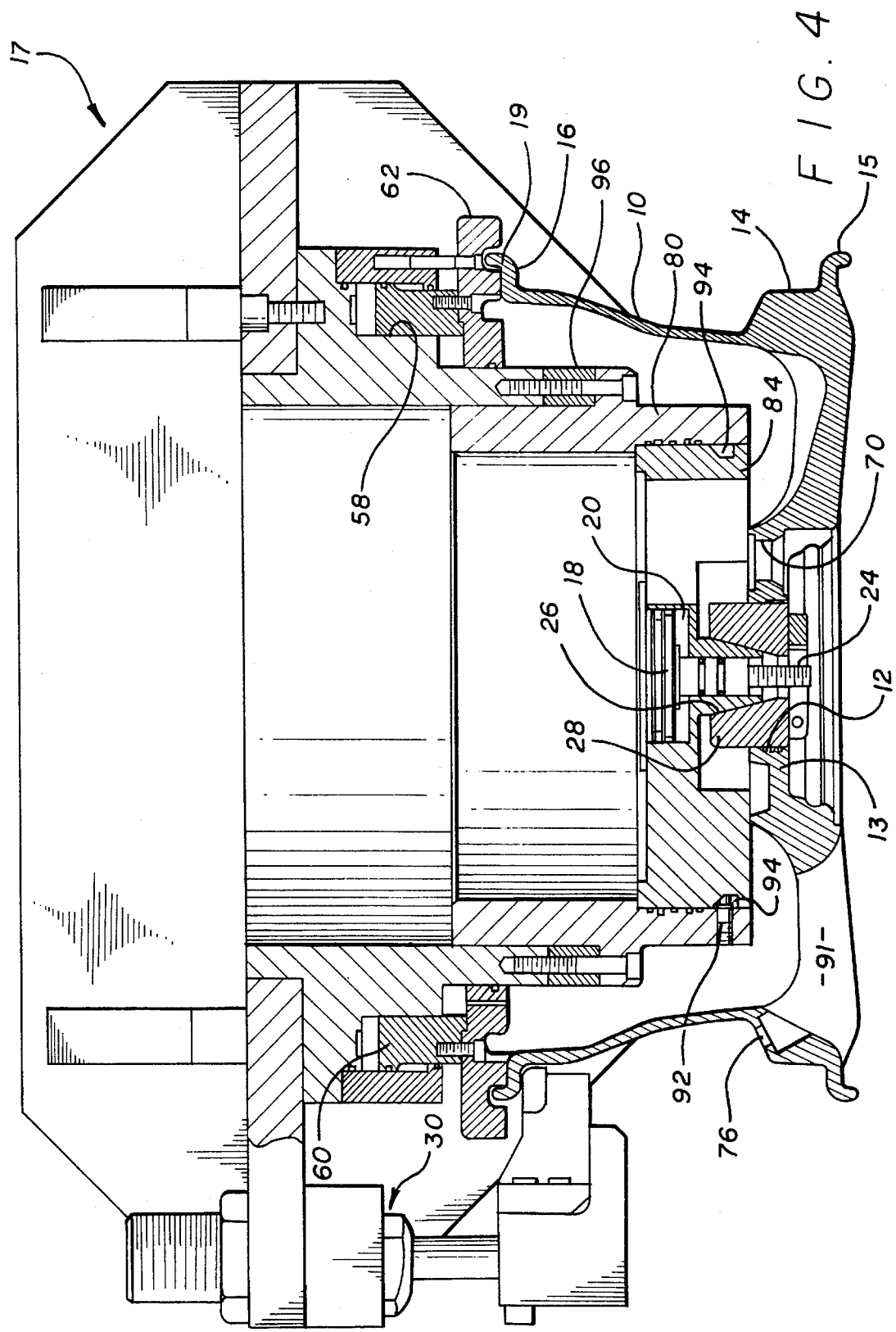
FIG. 4 is a sectional view of the apparatus shown in FIGS. 2 and 3 and is taken substantially on the line 4—4 of FIG. 3 and illustrates the apparatus in a fully locked relationship.
Figure 5:
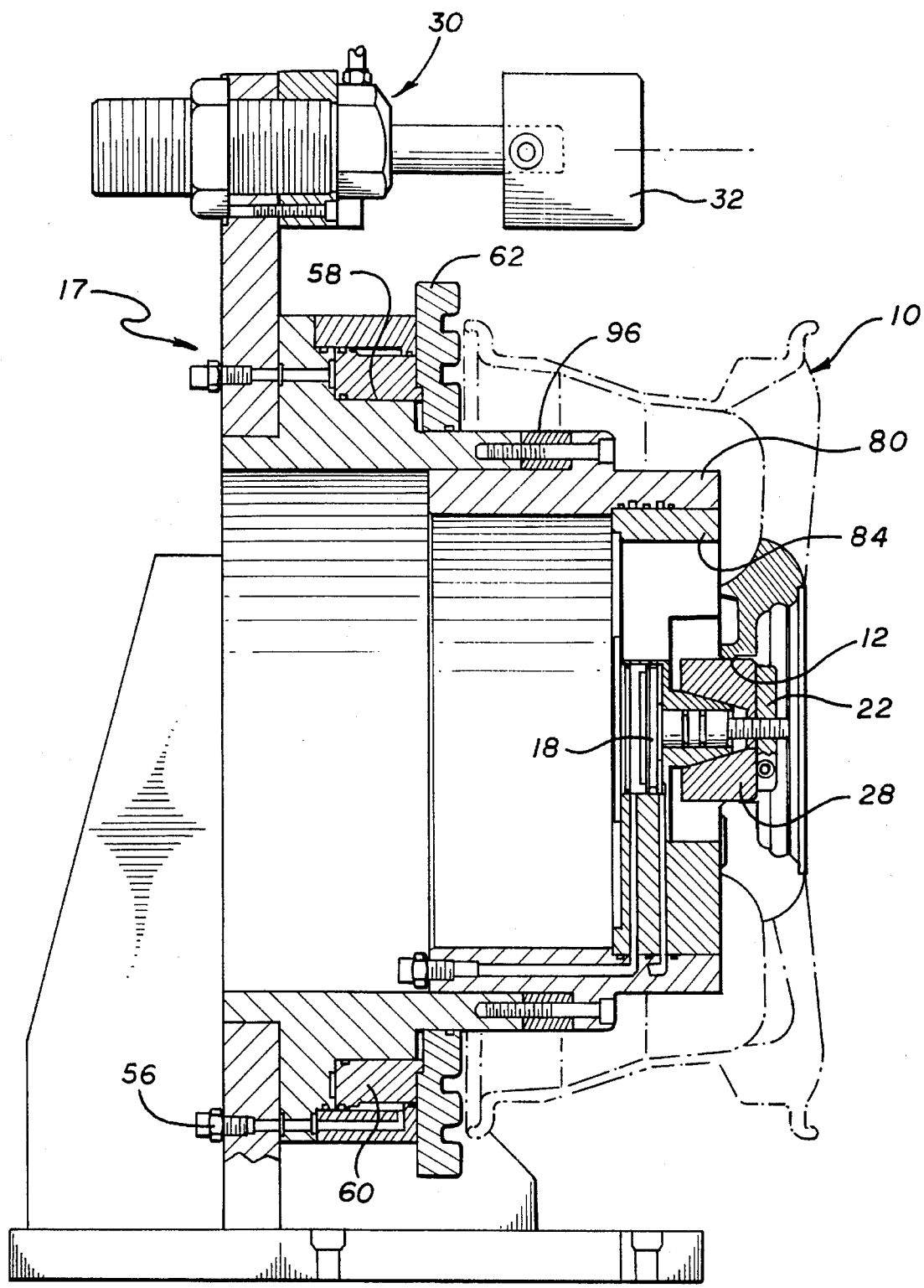
FIG. 5 is a sectional view taken substantially on the line 5—5 of FIG. 3 and illustrates the apparatus in an unlocked relationship.

Apparatus generally indicated at 17 is provided for drilling lug holes and a valve stem hole in the wheel. The apparatus 17 includes a piston 18 (FIGS. 4 and 5) movable in a cylinder 20. The piston 18 is connected to an adjustable clamping nut collar 22 by means of a threaded rod 24. The clamping nut collar 22 actuates an expandable collet 28. The inner periphery 26 of the collet 28 has a conical configuration corresponding to the conical configuration of the periphery 24 of the actuator 22.

Figure 6:
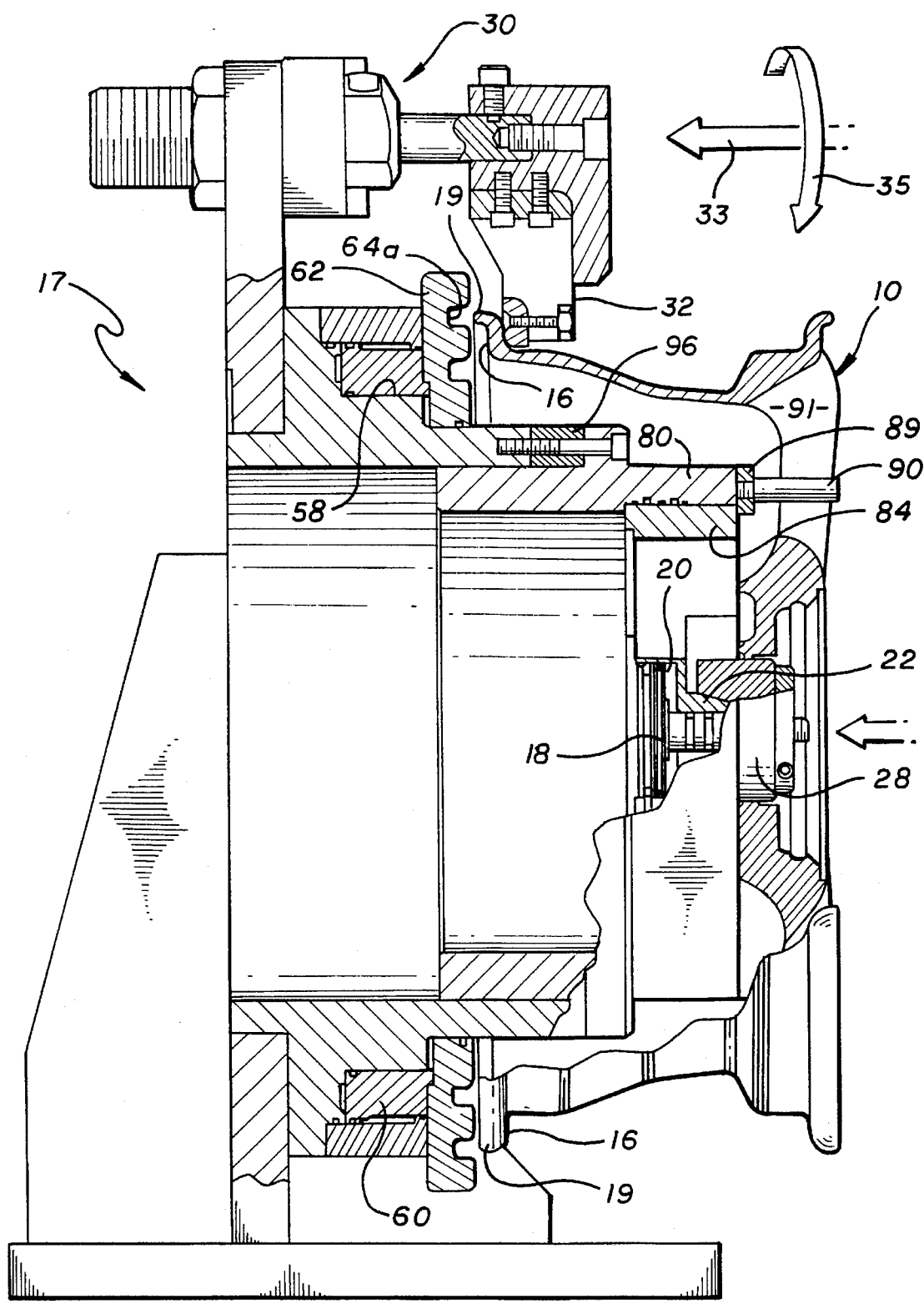
FIG. 6 is a view similar to that shown in FIG. 4 and illustrates the apparatus in a partially locked relationship.

A mechanism generally indicated at 30 (FIGS. 6, 7 and 8) is included in the apparatus 17 for moving clamping members 32 against the front side of the wheel 10 to positions contiguous to the flange 16 on the external periphery 14 of the wheel. Preferably three clamping members 32 are provided at equally spaced annular positions around the periphery of the wheel. The clamping members 32 are moved by pistons 34 (FIG. 7) which are disposed in cylinders 36.

Each of the pistons 34 has a slot 38 which extends in an axial direction 40 for a substantial distance and then extends through an additional distance in a direction 42 inclined to the axial direction. Pins 44 are disposed in the slots 40 to rotate the pistons 34 as the pistons move in the slots 38 through the inclined distance 42. Rods 46 are operatively coupled to the pistons 34 for movement with the pistons. The rods 46 in turn are coupled to the clamping members 32 for moving the clamping members 32 axially and rotationally in accordance with the movements of the pistons.

Figure 7:
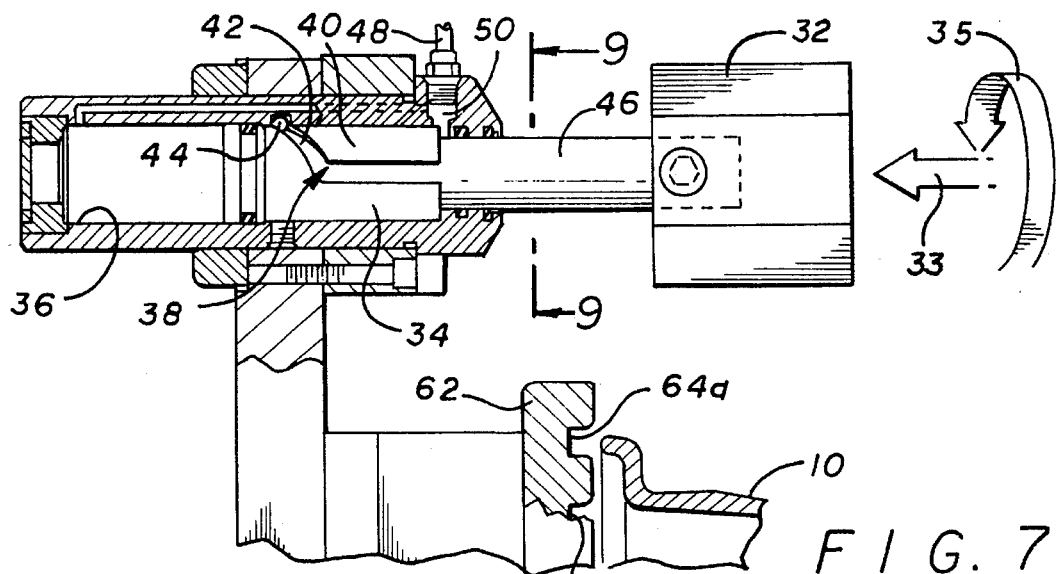
FIG. 7 is a fragmentary view similar to that shown in FIGS. 4 and 6 and illustrates in additional detail the construction of members included in the apparatus for moving the apparatus to the partially locked relationship shown in FIG. 6.
Figure 8:
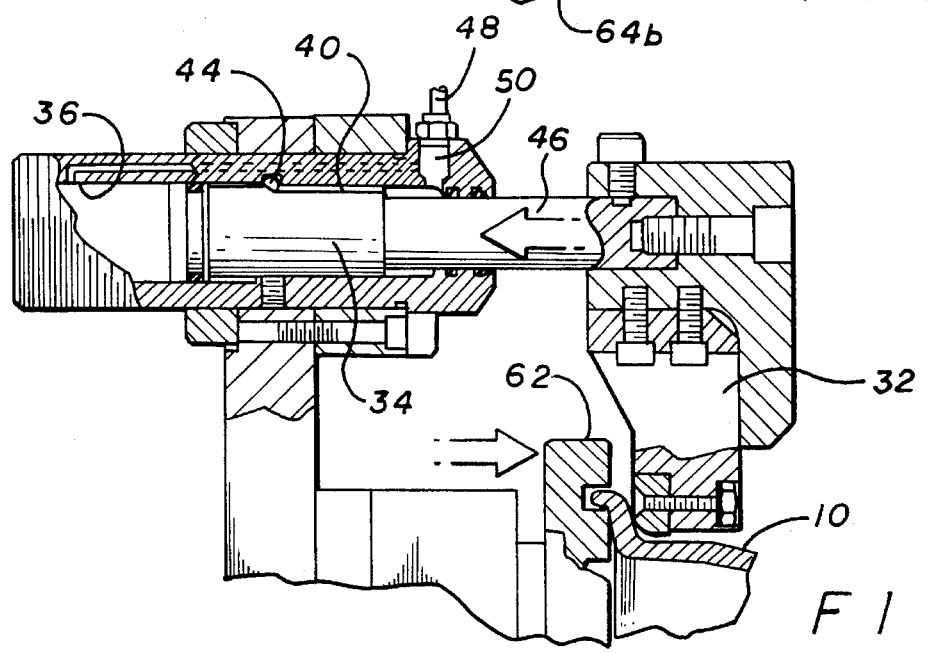
FIG. 8 is a fragmentary sectional view similar to that shown in FIGS. 4, 6 and 7 and shows the apparatus in fully locked relationship where the apparatus is ready to drill the lug holes in a wheel.
Figure 9:
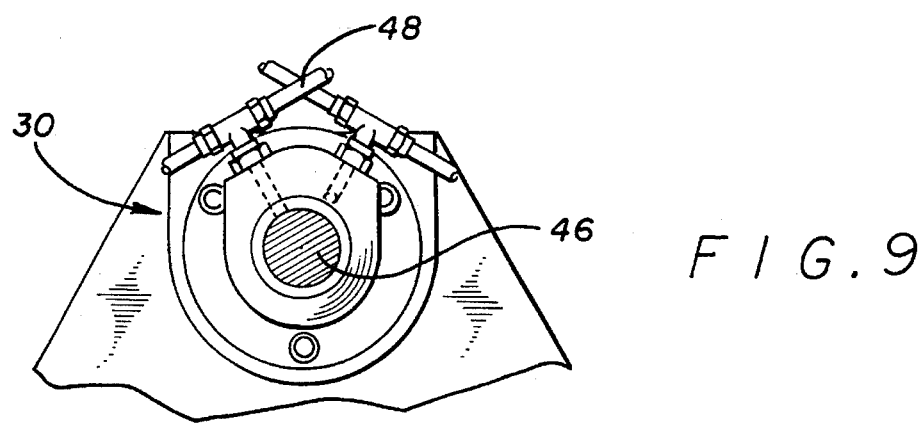
FIG. 9 is a sectional view taken substantially on the line 9—9 of FIG. 7 and illustrates certain hydraulic components in additional detail.

The axial and rotational movements of the clamping members 32 are respectively illustrated at 33 and 35 in FIG. 7. The pistons 34, the cylinders 36, the slots 38, the pins 46 and the rods 46 may be included in commercial units obtained from Vektek, Inc., and designated by Vektek as "Long Stroke Swing Clamp" with a model number of 15-0213-20.

Figure 11:
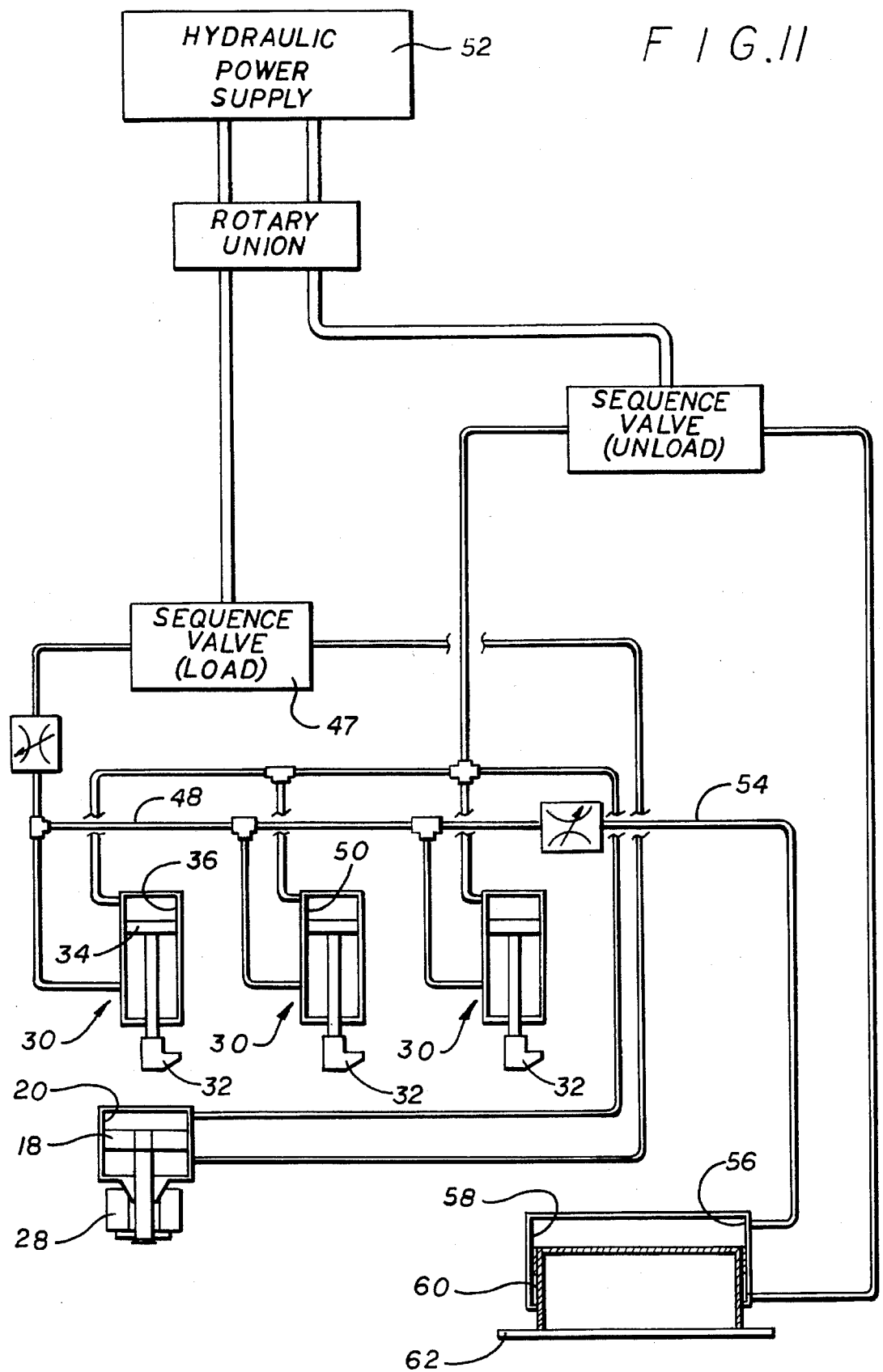
FIG. 11 is a schematic view of the hydraulic circuitry for operating the apparatus shown in FIGS. 1–10.

Hydraulic fluid is introduced into the cylinders 36 through a sequence valve 47 (FIG. 11) and a line 48 (FIGS. 7 and 11) and ports 50 from a hydraulic power supply 52 (FIG. 11). An hydraulic line 54 extends from the lines 48 to a port 56 which communicates with a cylinder 58. A piston 60 is disposed in the cylinder 58 for movement axially in accordance with the introduction of hydraulic fluid into the cylinder 58. A snubber ring or clamping member 62 (FIGS. 4–8) is coupled to the pistons 60 for axial movement with the pistons 60. The snubber ring or clamping member 62 has a groove 64a for receiving the rim 19 on the flange 16 at the external periphery of the wheel 10.

The piston 18 (FIGS. 4–6) is initially moved in the central bore 12 of the wheel 10 in a direction to dispose the actuator 22 against the collet 28 and to expand the collet against the wall 13 in the wheel. In this way, the wheel 10 is fixedly positioned at a radially interior position and the center of the wheel is established for the drilling operations subsequently to be provided on the wheel.

When the collet 28 has expanded against the wall 13 of the central bore 12 in the wheel 10, hydraulic fluid is introduced into the cylinders 36 (FIGS. 7 and 11) through the line 48 and the ports 50 from the hydraulic power supply 52 (FIG. 11). This causes the pistons 34 to move to the left in FIG. 7. The pistons 34 also rotate as they move to the left because of the action of the pins 44 in the slots 38. The axial and rotational movements of the pistons 34 cause the clamping members 32 to move into engagement with the front side of the wheel 10 at positions near the periphery 14 of the wheel 10.

During the time that hydraulic fluid is passing from the hydraulic power supply 52 through the ports 50 into the cylinders 36, the hydraulic fluid is not able to act on the piston 60 in the cylinder 58. This results from the fact that the port 56 is smaller than the port 50. When the snubber ring or clamping member 62 is moved downwardly by the fluid in the cylinder 56 from the position shown in FIG. 7 to the position shown in FIG. 8, the wheel 10 then becomes clamped between the clamping members 32 and the snubber ring or clamp 62. The clamping positions of the snubber ring 62 against the back side of the wheel 10 then preferably correspond radially to the clamping positions of the members 32 against the front side of the wheel.

Figure 12:
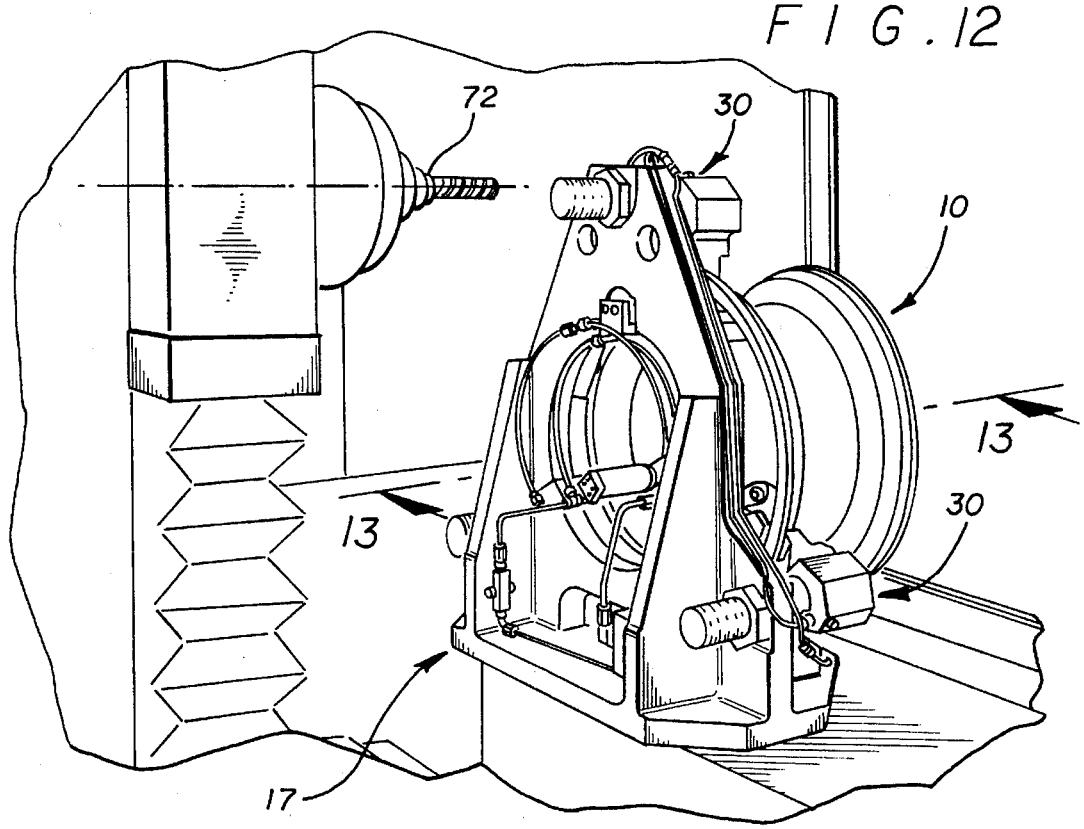
FIG. 12 is a perspective view similar to that shown in FIG. 2 and illustrates a second embodiment of the invention.

Lug holes 70 (FIG. 4) are then drilled by apparatus generally indicated at 72 on a schematic basis in FIGS. 12 and 15 through the wheel 10 from the front side of the wheel. Such drilling apparatus is well known in the art. The lug holes 70 are drilled concentric with the center of the wheel because of the action of the piston 18 (FIGS. 4–6) and the collet 28. Furthermore, no vibration of the wheel 10 occurs during the drilling operation because of the clamping provided by the collet 28 at a radially interior position of the wheel and the clamping provided by the clamping members 32 and the snubber ring or clamping member 62 at positions near the periphery 16 of the wheel. The lugs 70 may initially be drilled from the front of the wheel 10 as shown in FIG. 15B and then drilled from the rear of the wheel as shown in FIG. 15A. In this way, burrs are removed from the holes 70. The holes 70 may be drilled from the front and the rear by rotating on a vertical axis a table 74 (FIG. 1) on which the apparatus 17 is mounted.

Figure 15A:
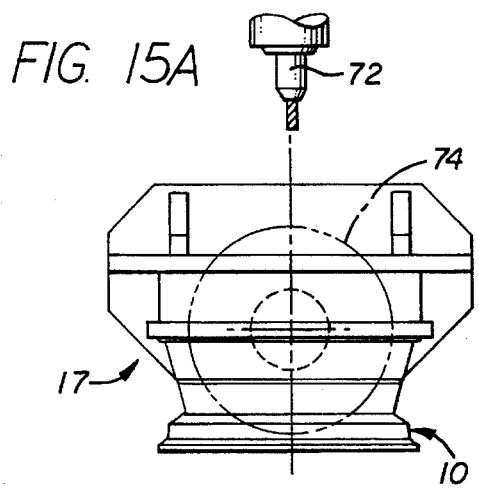
FIG. 15A is a schematic top plan view illustrating one positioning of the embodiments shown in FIGS. 1–11 and in FIGS. 12–14 for drilling lug holes in a wheel.
Figure 15B:
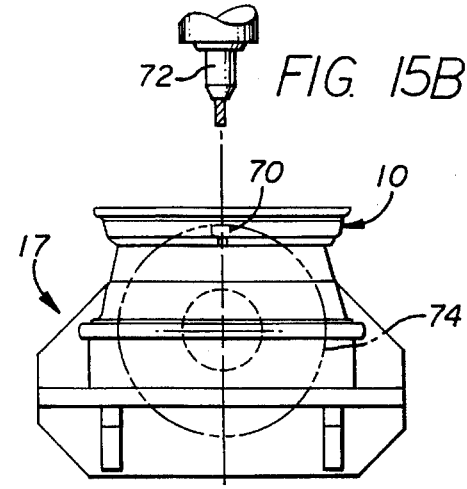
FIG. 15B is a schematic top plan view illustrating another positioning of the embodiments shown in FIGS. 1–11 and in FIGS. 12–14 for drilling the lug holes in the wheel.
Figure 15C:
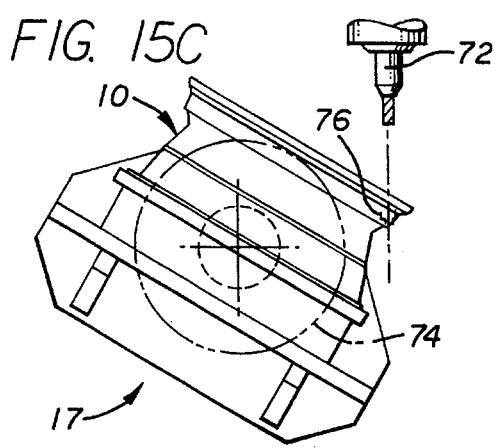
FIG. 15C is a schematic top plan view illustrating one positioning of the embodiments shown in FIGS. 1–11 and in FIGS. 12–14 for drilling the valve stem hole in the wheel.
Figure 15D:
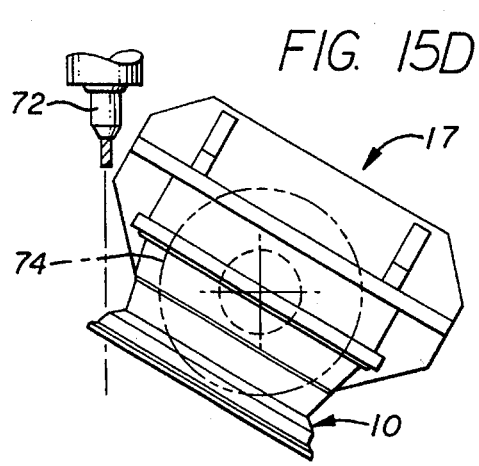
FIG. 15D is a schematic top plan view illustrating another positioning of the embodiment shown in FIGS. 1–11 and in FIGS. 12–14 for drilling the valve stem hole in the wheel.

The table 17 is then rotated through an acute angle of less than 90° from the position shown in FIGS. 15B to the position shown in FIG. 15C. The purpose of this is to provide for the drilling of a valve stem hole 76 (FIG. 4) in the wheel 10. As with the lug holes, the valve stem hole 76 can be drilled from the front and the rear to eliminate burrs. The drilling of the valve stem hole from the front is shown in FIG. 15C and the drilling of the valve stem hole from the rear is shown in FIG. 15D.

Figure 2:
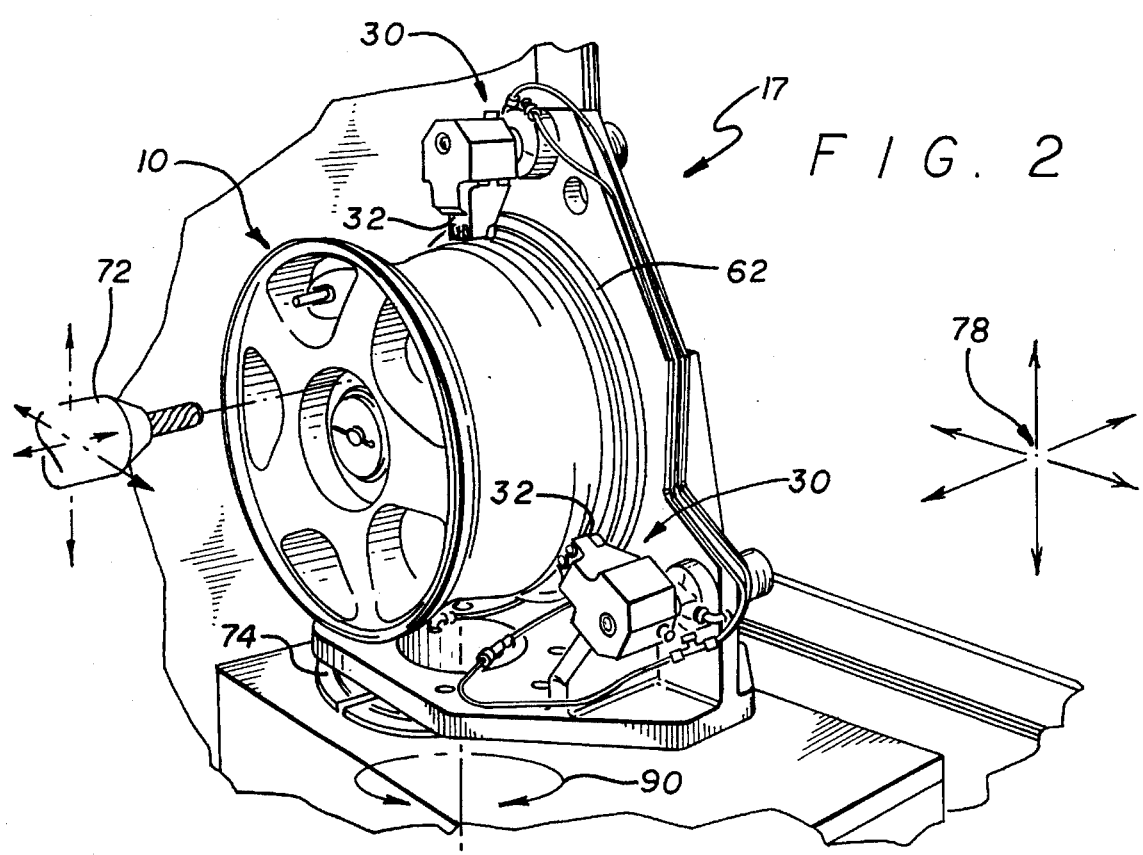
FIG. 2 is an enlarged fragmentary perspective view of the apparatus shown in FIG. 1 as seen primarily from the front and side of the apparatus and schematically illustrates in additional detail an operation of such apparatus.

The apparatus 17 constituting this invention incorporates a number of features which implement the basic operation of the apparatus as described above. For example, the rotary movement of the table 74 in a horizontal plane is indicated at 90 in FIG. 2. The drilling apparatus schematically indicated at 72 in FIG. 1 is shown at 78 as being positioned at any position in three (3) coordinate axes to drill holes in the wheel 10. This may be desirable to facilitate the drilling of individual holes in the wheel 10.

Figure 3:
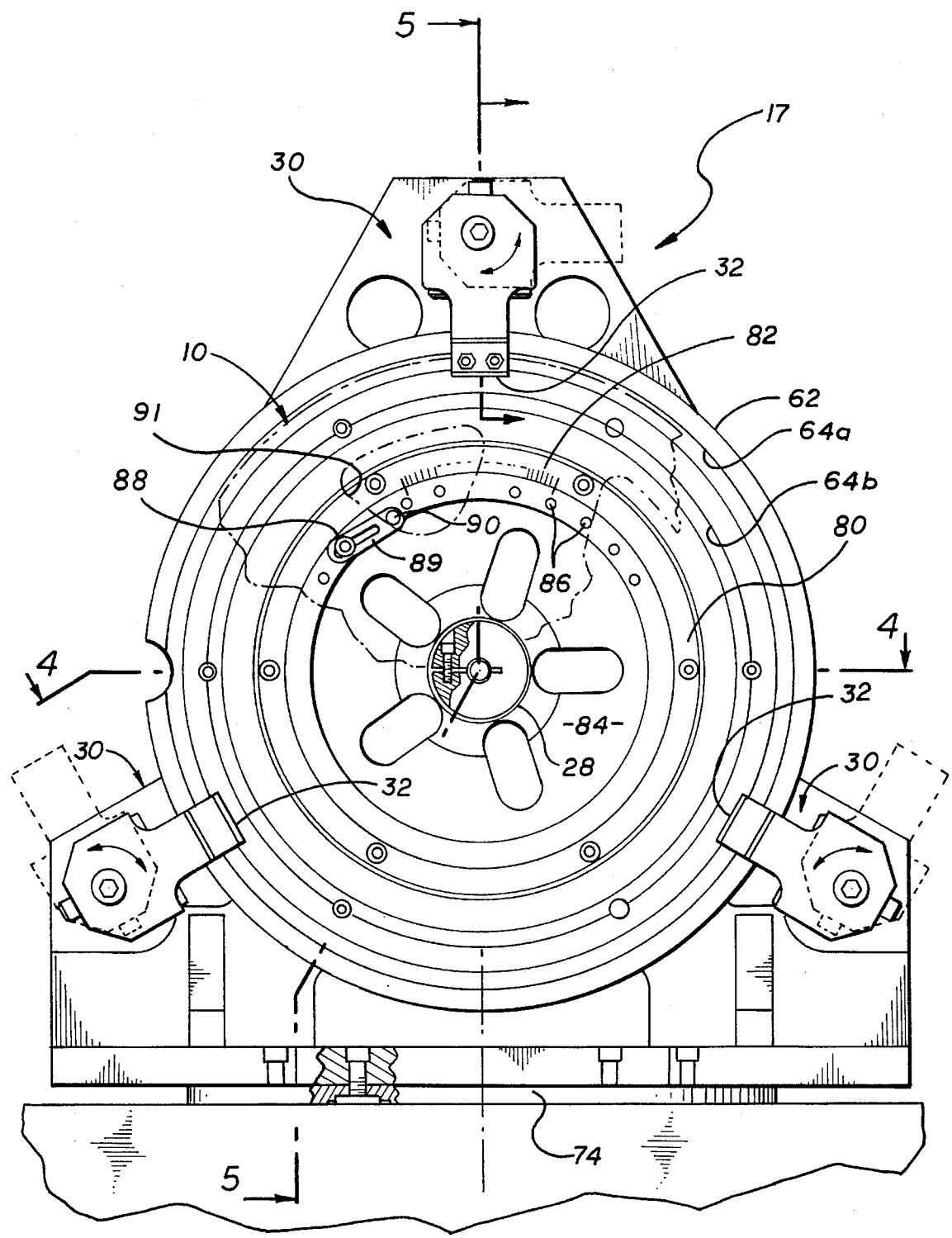
FIG. 3 is an enlarged front elevational view of the apparatus shown in FIG. 2.

A stationary member 80 is shown in FIG. 3 as being provided with vernier calibrations 82 to indicate desired positionings of a rotary member 84. The rotary member 84 is adapted to position the wheel 10. The rotary member 84 has a series of threaded holes 86 at a plurality of positions periodically spaced from one another in an annular direction near the periphery of the member 84. A stationary screw 88 extends through a link 89 which carries a location pin 90. The stationary screw 88 is threaded into a selected one of the holes 86. The screw 88, the link 89 and the location pin 90 (FIGS. 3 and 6) displaced from the link receive a socket 91 in the wheel 10.

In this way, the wheel 10 is positioned to assure that the valve stem hole 76 will be correctly positioned in the wheel relative to the other holes and apertures, including the lug holes 70, in the wheel. After the wheel 10 has been properly positioned, it is desirable to lock the rotary member 84 in position. This is accomplished by inserting set screws 92 (FIG. 4) through the stationary member 80 enveloping the rotary member into a socket 94 in the rotary member.

Figure 10:
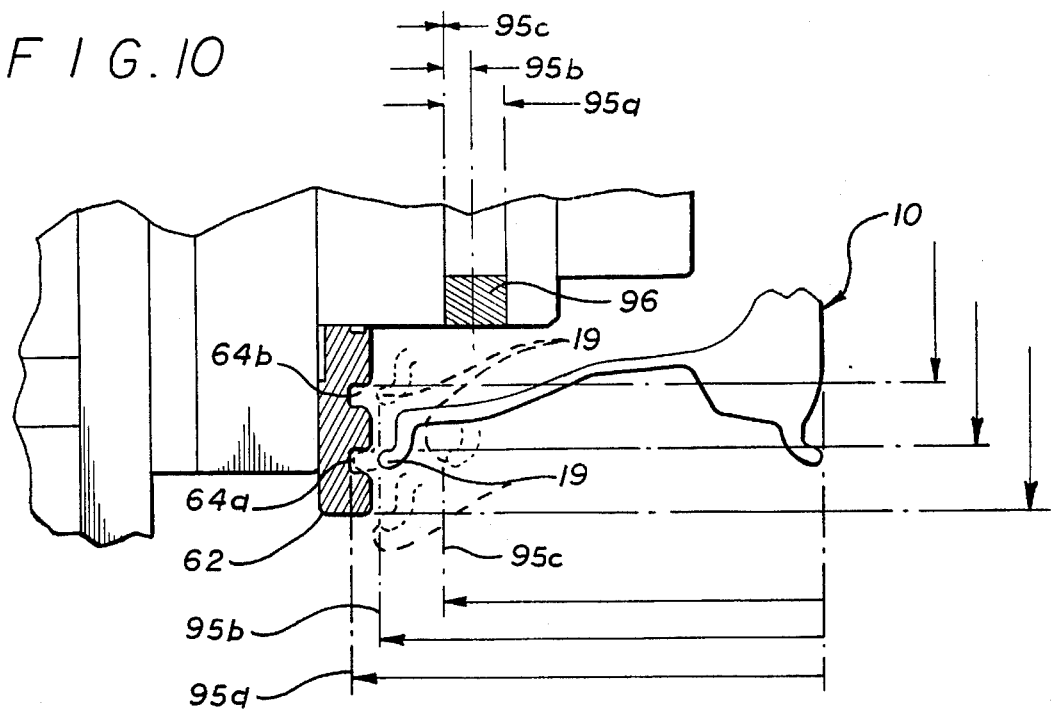
FIG. 10 is a view illustrating how the apparatus shown in the previous Figures is adaptable to accommodate wheels of different diameters and wheels of different axial widths.

As will be appreciated, different ones of the wheel 10 may have individual axial widths and individual radii. FIG. 10 schematically illustrates an arrangement for accommodating for such individual widths and individual radii in the different ones of the wheels 10. The different axial widths for the wheel 10 are indicated at 95a, 95b and 95c in FIG. 10. A spacer ring 96 (or no ring at all) may be provided to accommodate the differences in the width of the wheel as indicated schematically at 95a, 95b and 95c. Furthermore, the snubber ring or clamping member 62 may be provided with a plurality of grooves such as the grooves 64a and 64b to receive the rim 19 on the external periphery 16 of the wheel 10 regardless of the diameter of the external periphery of the wheel.

As will be appreciated, the lug holes 70 are concentric with the center of the wheel 10 and are annular in shape without any irregularities in the periphery. This causes the lugs to be maintained snugly in the lug holes 70 and prevents the lugs from working against the peripheries of the holes to enlarge the holes and loosen the wheels on the body of the motor vehicle. It will be appreciated that sockets for receiving the nuts threaded on the lug may also be provided by the drilling apparatus 72 and that these sockets will be concentric with the lug holes and also concentric with the center of the wheel 10. The valve stem hole 74 is also precisely positioned to receive the valve stem (not shown) on the tire which is disposed on the wheel 10. The valve stem hole 74 is also precisely positioned to receive the valve stem (not shown) on the tire which is disposed on the wheel 10.

The apparatus described above has other important advantages. When the apparatus for drilling the lug holes 70 and the valve stem hole 74 is pressed against the front side of the wheel 10 to form the lug holes, such apparatus produces a considerable force against the wheel. This force is counter-balanced by the clamping action of the members 32 and the snubber ring or clamping member 62. In this way, the wheel 10 is stabilized during the drilling of the lug holes 70 in the wheel.

Figure 13:
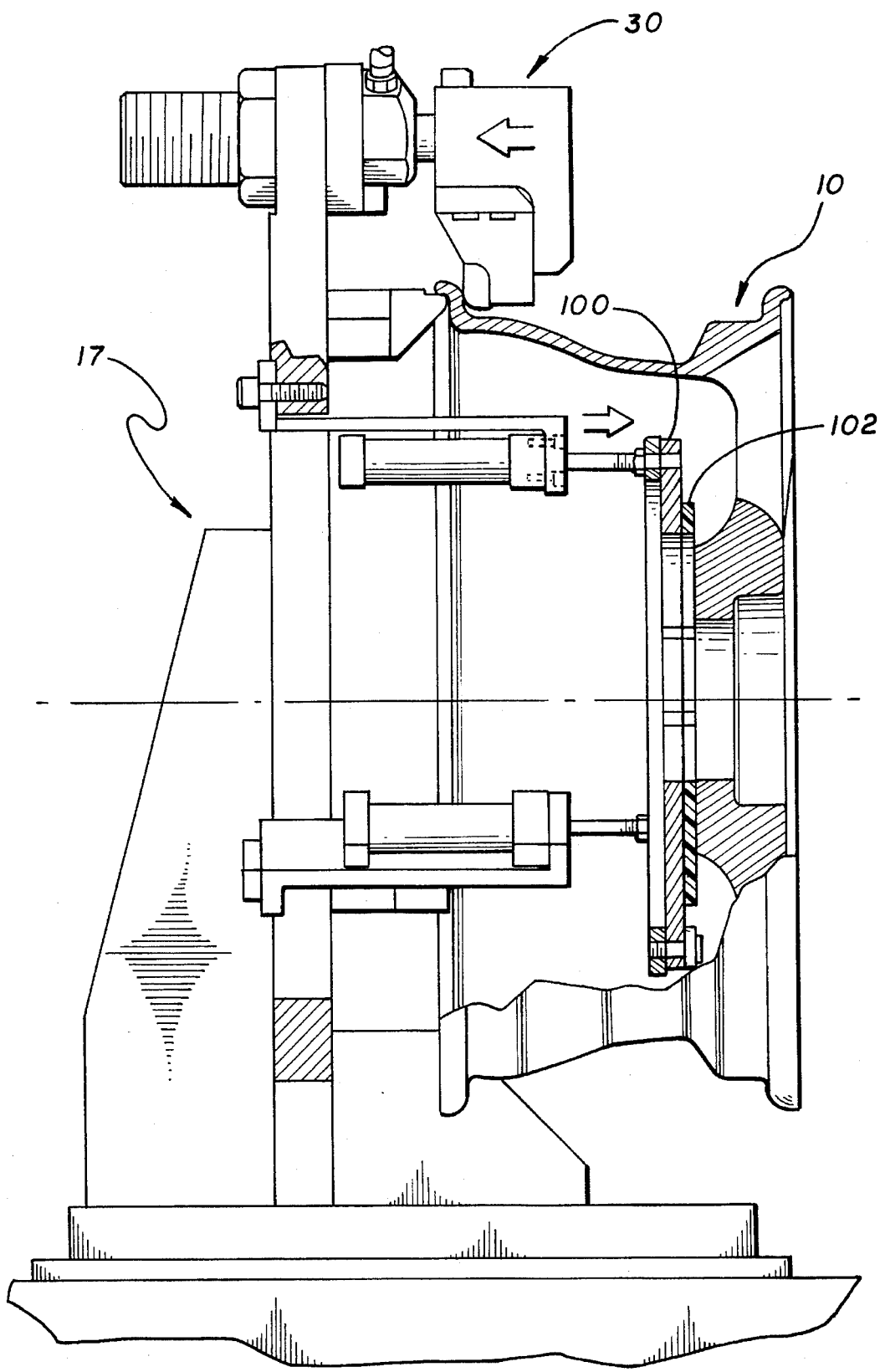
FIG. 13 is a side view of the embodiment of the apparatus shown in FIG. 12 and shows the features distinguishing the embodiment shown in FIG. 12 from the embodiment shown in FIGS. 1–10.
Figure 14:
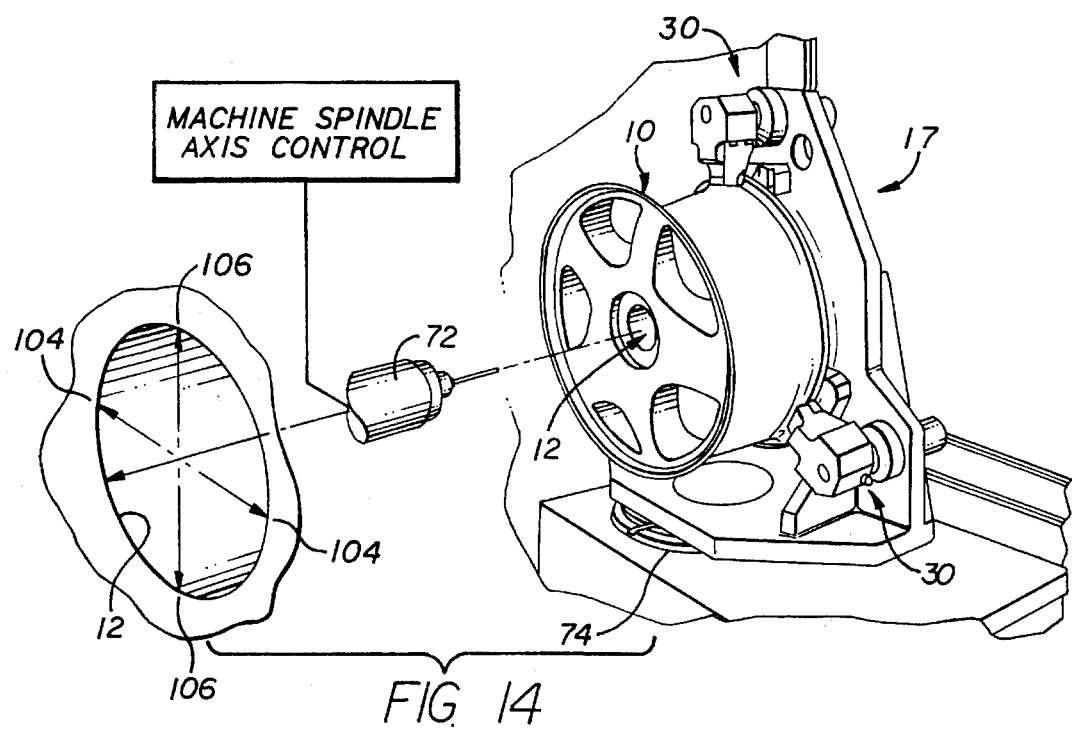
FIG. 14 is a schematic perspective view illustrating one step in the operation of the embodiment shown in FIGS. 12 and 13.

In the embodiment shown in FIGS. 12–14, the mechanism for moving the clamping members 32 and the snubber ring or clamping member 62 against the opposite sides of the wheel 10 is the same as described above and shown in FIGS. 1–11. However, the mechanism for engaging the wheel 10 at a position radially interior to the clamping positions provided by the clamping members 32 and the snubber ring or clamping member 62 different.

In the embodiment shown in FIGS. 12–14, an annular ring 100 (FIG. 13) having a hollow annular configuration and preferably made from a metallic material is moved into position against the backside of the ring. A resilient pad 102 having a hollow annular configuration is disposed in front of the ring 100 in concentric relationship with the ring. The resilient pad 102 actually engages the back side of the wheel 10 when the ring 100 and the pad 102 are moved against the back side of the wheel 10. This protects the wheel while the lug holes 70 and the valve stem hole 76 are being drilled in the wheel.

In order to assure that the ring 100 and the pad 102 are concentric with the center of the wheel 10, the center of the wheel is initially determined. This is accomplished by probing the opposite horizontal and vertical extremities 104 and 106 of the central bore 12 as indicated schematically in FIG. 14. The probing may be done by the equipment which positions the ring 100 and the pad 102 against the back side of the wheel 10. Data processors (not shown) associated with such equipment may then process the data to determine the positioning of the equipment in disposing the pad 100 and the ring 102 against the back side of the wheel 10 in concentric relationship with the central bore 12.

As previously discussed in connection with the embodiment shown in FIGS. 1–11, the equipment for drilling the lug holes 70 produces a force against the wheel 10 while the holes are being drilled. In the embodiment shown in FIGS. 12–14, the counter balancing force is produced by the ring 100 rather than by the clamping members 32 and the snubber ring or clamping member 62 as in the embodiment shown in FIGS. 1–11. This is particularly true when the drilling force is against the front side of the wheel 10. Producing the counterbalancing force at the ring 10 may not be as desirable as producing the counterbalancing force at the periphery of the wheel 10 since it may not provide as much stability against vibration of the wheel 10 as in the embodiment shown in FIGS. 1–11.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for providing for the drilling of lug holes and valve stem holes in a wheel for a motor vehicle having an axle and lugs where the wheel has a central bore for receiving the axle and where lug holes are to be provided in the wheel for receiving the lugs and nuts for holding the lugs, first means movable to a position within the central bore for fixedly holding the wheel at the wheel center, second means for operating upon the first means to move the first means to the position within the central bore for fixedly holding the wheel at the wheel center, third means movable against one side of the wheel near the periphery of the wheel for holding the one side of the wheel, fourth means for operating upon the third means to move the third means against the one side of the wheel near the periphery of the wheel, and fifth means for cooperating with the third means at the other side of the wheel near the periphery of the wheel in clamping the wheel after the third means has been moved against the one side of the wheel near the periphery of the wheel.

2. In a combination as recited in claim 1 wherein the first means includes an expansible collet and the second means includes an actuator movable into the collet to expand the collet.

3. In a combination as set forth in claim 1 wherein the third means is movable axially and rotatable radially and wherein the fourth means moves the third means axially against the one side of the wheel near the periphery of the wheel and rotates the third means radially from a position displaced from the periphery of the wheel to a position radially within the periphery of the wheel as it moves the third means axially against the one side of the wheel periphery.

4. In a combination as set forth in claim 3 wherein the fifth means is responsive to the movement of the third means against the one side of the wheel near the periphery of the wheel for clamping against the other side of the wheel near the periphery of the wheel.

5. In a combination as set forth in claim 1, means for positioning the wheel before the drilling of the lug holes and the valve stem hole to provide for the drilling of the valve stem hole at a predetermined position relative to the valve stem hole.

6. In a combination as set forth in claim 1, means for compensating for differences in the axial width and the radii of individual ones of the wheels before the drilling of the lug holes and the valve stem holes in the wheels.

7. In combination for providing for the drilling of lug holes and a valve stem hole in a wheel for a motor vehicle having an axle and lugs where the wheel has a central bore for receiving the axle and where lug holes are to be provided in the wheel for receiving the lugs and nuts for holding the lugs, first means movable relative to the wheel at a first position for holding the wheel radially inward from the periphery of the wheel, second means movable relative to the wheel for disposition against one side of the wheel at a position near the periphery of the wheel and radially outward from the disposition of the first means against the wheel, and third means responsive to the movement of the second means against the one side of the wheel for moving against the other side of the wheel near the periphery of the wheel to cooperate with the second means in clamping the wheel near the periphery of the wheel.

8. In a combination as set forth in claim 7 wherein the first means engages the wheel before the engagement of the wheel by the second and third means.

9. In a combination as set forth in claim 8 wherein the second means engages the wheel before the engagement of the wheel by the third means.

10. In a combination as set forth in claim 8 wherein the first means engages the wheel at the hole in the wheel.

11. In a combination as set forth in claim 8 wherein the first means engages the wheel at a position between the hole in the wheel and the periphery of the wheel and radially interior to the engagement of the wheel by the second and third means.

12. In a combination as set forth in claim 7 wherein the second means is movable axially and rotationally relative to the wheel for disposition against the one side of the wheel near the periphery of the wheel, and the third means is movable axially against the other side of the wheel for disposition against the other side of the wheel for co-operation with the second means in clamping the wheel near the periphery of the wheel.

13. In a combination as set forth in claim 7 wherein means are provided for compensating for wheels with different axial widths and different radii.

14. In a combination as set forth in claim 7 wherein means are provided for positioning the wheel to obtain the production of the valve stem hole at a particular annular position on the wheel.

15. In a combination as set forth in claim 12 wherein the first means engages the wheel before the engagement of the wheel by the second and third means, the second means engages the wheel before the engagement of the wheel by the third means, the first means engages the wheel at the hole in the wheel, the first means engages the wheel at a position between the hole in the wheel and the periphery of the wheel and radially interior to the engagement of the wheel by the second and third means, means are provided for compensating for wheels with different axial widths and different radii, and means are provided for positioning the wheel to obtain the production of the valve stem hole at a particular annular position on the wheel.

16. In combination for providing for the drilling of lug holes and a valve stem hole in a wheel of a motor vehicle having an axle and lugs where the wheel has a central bore for receiving the axle and where lug holes are to be provided in the wheel for receiving the lugs and nuts for holding the lugs, first means for providing a first force against the wheel at a position near the center of the wheel, second means for providing a second force against a first side of the wheel at a position near the periphery of the wheel, and third means for providing a third force against the other side of the wheel at a position substantially corresponding radially to the radial position of the second force.

17. In a combination as set forth in claim 16, the third means providing the third force against the other side of the wheel at a position substantially corresponding annularly to the position of the second force, and fourth means for drilling the lug holes and the valve stem hole in the wheel during the application of the first, second and third forces against the wheel.

18. In a combination as set forth in claim 17, a rotatable table for holding the first, second and third means, the fourth means being operable to drill the lug holes and the valve stem hole through the wheel from the opposite sides of the wheel in accordance with the rotation of the table, the third means being operable to vary the forces produced against the other side of the wheel by the application of the forces against the first side of the wheel by the fourth means to compensate for the application of such forces.

19. In a combination as set forth in claim 17, the second means being operable to vary the forces produced against the first side of the wheel by the application of the forces against the other side of the wheel by the fourth means to compensate for the application of such forces.

20. In a combination as set forth in claim 17, means for compensating for differences in the axial widths and the radii of individual ones of the wheels.

21. In a combination as set forth in claim 20, means for positioning the wheel prior to the drilling of the holes in the wheel to obtain the production of the valve stem hole at a particular position relative to the other holes in the wheel.

22. In combination for providing for the drilling of lug holes in a wheel for a motor vehicle having an axle and lugs where the wheel has a central bore for receiving the axle and where lug holes and a valve stem hole are to be provided in the wheel for receiving the lugs and nuts for holding the lugs, first means for providing a first force against the wheel at a position near the center of the wheel, second means movable in an axial and rotary direction for hydraulically applying a force against a first side of the wheel at a position near the periphery of the wheel, third means movable in an axial direction for hydraulically applying a force against the other side of the wheel at a position substantially directly opposite the application of the hydraulic force against the first side of the wheel, and hydraulic means for initially obtaining an axial and rotational movement of the second means until the disposition of the second means against the first side of the wheel and for thereafter obtaining an axial movement of the third means against the other side of the wheel.

23. In a combination as set forth in claim 22, the second means including a cylinder and a piston movable in the cylinder and a pin movable with the piston and a slot in the cylinder for receiving the pin and for producing an axial and rotational movement of the piston in accordance with the introduction of hydraulic fluid to the cylinder and including means movable with the piston for becoming disposed against the first side of the wheel in accordance with the axial and rotational movement of the piston.

24. In a combination as set forth in claim 22, the third means including a cylinder and a piston disposed in the cylinder for axial movement in the cylinder in accordance with the introduction of a hydraulic fluid to the cylinder and including means movable with the piston for applying the force against the other side of the wheel at the position substantially directly opposite the application of the force against the first side of the wheel.

25. In a combination as set forth in claim 22, the hydraulic means including a first line extending to the second means and a second line extending from the first line to the third means, the first and second lines having relative characteristics to provide initially for the movement of the second means against the wheel and then for the third means against the wheel when the second means has been moved axially and rotationally against the wheel.

26. In a combination as set forth in claim 23, the third means including a cylinder and a piston disposed in the cylinder for axial movement in the cylinder in accordance with the introduction of a hydraulic fluid to the cylinder and including means movable with the piston for applying the force against the other side of the wheel at the position substantially directly opposite the application of the force against the first side of the wheel, the hydraulic means including a first line extending to the cylinder in the second means and a second line extending from the first line to the cylinder in the third means, the first and second lines having relative characteristics to provide initially for the movement of the first means against the wheel and then for the movement of the third means against the wheel when the second means has been moved axially and rotationally against the wheel.

27. In a combination as set forth in claim 26, means for positioning the wheel before the drilling of the lug holes and the valve stem hole in the wheel to provide for the production of the valve stem hole at a particular position relative to the other holes in the wheel, and means for compensating for differences in different axial widths and radii in individual ones of the wheels.

28. In combination for the drilling of lug holes in a wheel for a motor vehicle having an axle and lugs where the wheel has a central bore for receiving the axle and where lug holes and a valve stem hole are to be provided in the wheel for receiving the lugs and nuts for holding the lugs, first means including a ring movable against a first side of the wheel at a position between the center of the wheel and the periphery of the wheel for positioning the wheel against movement, second means including a first clamping member movable against a second side of the wheel at a position radially outwardly from the position of the ring against the first side of the wheel and near the periphery of the wheel, and third means including a second clamping member movable against the first side of the wheel, after the movement of the first clamping member against the second side of the wheel, at a radial position corresponding to the radial position of the first clamping member.

29. In a combination as set forth in claim 28, a resilient member movable with the ring and positioned to engage the first side of the wheel when the ring moves toward the first surface of the wheel.

30. In a combination as set forth in claim 28, the second means being operative to move the first clamping member axially and rotationally relative to the wheel from a position displaced from the wheel to the position against the second side of the wheel near the periphery of the wheel, the third means being operative to move the second clamping member axially relative to the wheel from a position displaced from the wheel to the position against the first side of the wheel near the periphery of the wheel.

31. In a combination as set forth in claim 30, hydraulic means operatively coupled to the second and third means for initially obtaining a movement of the first clamping member against the second side of the wheel near the periphery of the wheel and for obtaining a movement of the second clamping member against the first side of the wheel after the movement of the first clamping member against the second side of the wheel.

32. In a combination as set forth in claim 31, the hydraulic means including a first cylinder and a first piston disposed in the first cylinder for moving the first clamping member rotationally and axially and including a first line communicating with the first cylinder for introducing hydraulic fluid into the first cylinder to obtain such movement of the first piston, the hydraulic means also including a second cylinder and a second piston disposed in the second cylinder for moving the second clamping member axially and including a second line communicating with the second cylinder for introducing hydraulic fluid into the second cylinder to obtain such movement of the second piston, the first line communicating with the second line and being larger than the second line.

33. In a combination as set forth in claim 32, a resilient member movable with the ring and positioned to engage the first side of the wheel when the ring moves toward the first surface of the wheel.

34. In a method of providing for the drilling of lug holes in a wheel for a motor vehicle having an axle and lugs where the vehicle has a central bore for receiving the axle and where lug holes and a valve stem hole are to be provided in the wheel for receiving the lugs and nuts for holding the lugs, the steps of:

initially disposing a first member against the wheel at a first position displaced a first radial distance from the radial center of the wheel, subsequently disposing a second member against one side of the wheel at a second position near the external periphery of the wheel and displaced radially outwardly from the first position on the wheel, and thereafter disposing a third member against the other side of the wheel at a third position substantially radially aligned with, but displaced axially from, the second position and in clamping relationship with the second member against the wheel.

35. In a method as set forth in claim 34, the step of:

drilling a lug hole in the wheel at a radial position between the first position and the second and third positions after the second and third members have been clamped against the wheel.

36. In a method as set forth in claim 35 wherein the first member is disposed within the central bore and is expanded against the wall defining the central bore in the wheel.

37. In a method as set forth in claim 35 wherein the first member is a ring disposed against the other side of the wheel at a position radially between the central bore and the second and third positions in the wheel.

38. In a method as set forth in claim 34, the steps of:

compensating for differences in the axial widths and the radii of individual ones of the widths, and positioning the wheel before any drilling of the holes in the wheel to obtain a desired relationship between the valve stem hole and the other holes in the wheel.

39. In a method of providing for the drilling of lug holes in a wheel for a motor vehicle having an axle and lugs where the vehicle has a central bore for receiving the axle and where lug holes and a valve stem hole are to be provided in the wheel for receiving the lugs and nuts for holding the lugs, the steps of:

initially disposing a first holding member against the wheel at a position near the center of the wheel, then disposing a first clamping member against a first side of the wheel at a position near the periphery of the wheel, and thereafter disposing a second clamping member against a second side of the wheel at a position corresponding to the position of the first clamping member on the first side of the wheel.

40. In a method as set forth in claim 39, the step of:

drilling the lug holes in the wheel after the second clamping member has been positioned against the second side of the wheel.

41. In a method as set forth in claim 39, the steps of:

the holding member constituting a ring, determining the horizontal position of the center of the central bore in the wheel, and thereafter adjusting the horizontal disposition of the ring for movement against the second side of the wheel in accordance with the determination of the center of the central bore, and then disposing the ring against the second side of the wheel at a position concentric with the central bore in the wheel.

42. In a method as set forth in claim 39 wherein the holding member is disposed in the central bore and is expanded against the wall of the wheel defining the central bore.

43. In a method as set forth in claim 39 wherein the first clamping member is initially disposed in axially and radially spaced relationship to the first side of the wheel and is moved axially, and simultaneously rotated radially, into engagement with the first side of the wheel near the periphery of the wheel and wherein the second clamping member is initially disposed axially from the second side of the wheel and is moved axially into engagement with the second side of the wheel near the periphery of the wheel after the first clamping member has been moved into engagement with the first side of the wheel.

44. In a method as set forth in claim 43 wherein the first clamping member is moved hydraulically into engagement with the first side of the wheel and the second clamping member is moved hydraulically into engagement with the second side of the wheel, and the first and second clamping members are coupled hydraulically to provide for the movement of the first clamping member into engagement with the first side of the wheel before the movement of the second clamping member into engagement with the second side of the wheel.

45. In a combination as set forth in claim 44, the holding member constituting a ring, determining the horizontal position of the center of the central bore in the wheel, and thereafter adjusting the horizontal disposition of the ring in accordance with the determination of the center of the central bore, and then disposing the ring against the second side of the wheel at a position concentric with the central bore in the wheel, and drilling the lug holes in the wheel after the positioning of the second clamping member against the second side of the wheel.

46. In a method as set forth in claim 40, the steps of:

positioning the wheel before any drilling of holes in the wheel to obtain the production of the valve stem hole in a particular relationship to the other holes in the wheel.

47. In a method as set forth in claim 39, the step of: compensating for differences in the axial widths and the radii in individual ones of the wheels.

48. In a method as set forth in claim 44 wherein the holding member is disposed in the central bore and is expanded against the wall of the wheel defining the central bore, and the lug holes are drilled in the wheel after the positioning of the second clamping member against the second side of the wheel.

* * * * *